(12) United States Patent
Takeda et al.

(10) Patent No.: US 6,336,189 B1
(45) Date of Patent: Jan. 1, 2002

(54) APPARATUS AND METHOD FOR DATA CAPSULE GENERATION

(75) Inventors: Koji Takeda; Kazuo Saito; Kenichiro Kigo, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/110,270

(22) Filed: Jul. 6, 1998

(30) Foreign Application Priority Data

Jul. 10, 1997 (JP) ............................................. 9-184872

(51) Int. Cl.[7] ................................................ G06F 11/00
(52) U.S. Cl. ...................................................... 713/200
(58) Field of Search ................................ 713/200, 164, 713/167, 171, 193, 176, 181, 183

(56) References Cited

U.S. PATENT DOCUMENTS

| | | | | |
|---|---|---|---|---|
| 5,337,360 A | * | 8/1994 | Fischer | 709/316 |
| 5,765,152 A | * | 6/1998 | Erickson | 707/9 |
| 5,815,573 A | * | 9/1998 | Johnson | 380/286 |
| 5,825,877 A | * | 10/1998 | Dan | 705/53 |
| 5,892,899 A | * | 4/1999 | Aucsmith | 703/200 |
| 5,970,145 A | * | 10/1999 | McManis | 713/187 |
| 5,991,401 A | * | 11/1999 | Daniels | 713/181 |
| 5,995,625 A | * | 11/1999 | Sudia | 713/156 |
| 6,006,328 A | * | 12/1999 | Drake | 713/200 |
| 6,021,201 A | * | 2/2000 | Bakhle | 713/189 |
| 6,063,134 A | * | 5/2000 | Peters | 717/11 |

* cited by examiner

*Primary Examiner*—Robert Beausoleil
*Assistant Examiner*—Bryce P. Bonzo
(74) *Attorney, Agent, or Firm*—Oliff & Berridge, PLC (57) ABSTRACT

A data capsule comprises an encrypted data hold means which holds an encrypted version of data which is provided for use, a verification means which communicates with an external proving device to get proof data generated by it and verifies the legitimacy of the proof data, a usage control means which enables the use of the data based on the verification result provided by the verification means, and a decryption means which decrypts the data held by the data hold means. The data is decrypted for use in response to the successful verification of the proof data from the proving device.

12 Claims, 13 Drawing Sheets

Original program                    Capsulized program

APPARATUS AND METHOD FOR DATA CAPSULE GENERATION

BACKGROUND OF THE INVENTION

1. Field of the Invention

The present invention relates to the technique pertaining to the access control of programs and data which are handled by a computer, and particularly to the technique for providing programs and data themselves with the access control function.

2. Description of the Prior Art

There have been two major types of access control for programs and data which are handled by a computer, one being based on the access control list, the other being based on the capability. The access control list includes three items, which are data as a target of access, the host of access, and the condition of access right. Specifically, it stores attributes of data indicative of what type of access by what person is to be permitted. This kind of technique is proposed in Japanese Published Unexamined Patent Application No. Sho 62-235655, for example. This proposal is intended to implement the access control not only by the host of access, but also by the terminal used by the host.

The capability provides the host of access with information of access control so that the host of access presents the access right to the target of access before the host is enabled to access the target. This kind of technique is proposed in Japanese Published Unexamined Patent Application No. Sho 62-251948, for example. This proposal is designed to use a character string for the attribute of data, so that the user who intends to make access to data presents a specific character string to the data.

In order to cope with illegal access attempts which cannot be dealt with by the ordinary access control technique, such as the case of direct analysis of physical characteristics of the storage medium which stores data, there has been proposed the combination of the access control technique and the encryption technique, as described in Japanese Published Unexamined Patent Applications No. Sho 63-311454, No. Hei 03-276345, and No. Hei 09-44407.

The above-mentioned techniques are all based on the premise of the usage within the access control system, and access control of data becomes infeasible once data is taken out and put into other system. Although it is possible to encrypt data so that non-legitimate persons cannot take out decrypted data and put it into other systems, if data is put into other system by a legitimate user, access control of the data is no longer feasible and the data will be accessed by non-legitimate persons. It is possible to preclude legitimate users from taking out decrypted data, however, in this case even legitimate users cannot use data in other systems unless it has the access control function identical to that of the inherent system.

SUMMARY OF THE INVENTION

The present invention is intended to overcome the foregoing prior art deficiencies, and there are arranged, in correspondence to data, verification means which authenticate the right of access to the data and usage control means which enable the access to the data when the access right is verified, with this set of means and data being treated as a data capsule.

In case there exists a manner of data access beyond the control range of the usage control means, then data is encrypted in advance, there are arranged, in correspondence to the data, verification means which authenticate the right of access to the data, usage control means which enables the access to the data when the access right is verified, and decryption means which decrypt the data, with this set of means and data being treated as a data capsule.

In case the data decryption key exists within the data capsule, illegal data access can possibly be made based on the analysis of the data capsule, the extraction of the data decryption key, and the decryption of the data. For preventing this impropriety, it is desirable to get the key for decrypting encrypted data from information in the data capsule and information which proves the user's access right.

DESCRIPTION OF THE PREFERRED EMBODIMENTS

The arrangement and operation of the data capsule based on this invention will be explained first in detail, and next the data capsule generation apparatus will be explained.

Figure 1:
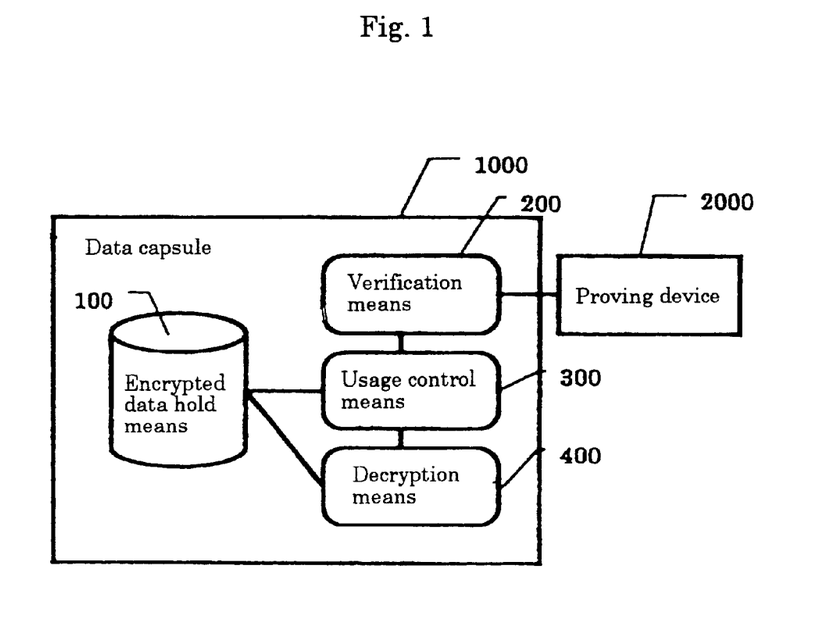
FIG. 1 is a block diagram showing the data capsule based on a first embodiment of this invention.

Embodiment 1:

The first embodiment of this invention will be explained. FIG. 1 shows the arrangement of a data capsule 1000 based on this embodiment, and also shows the relation of the data capsule 1000 with an external proving device 2000. In the figure, the data capsule 1000 comprises an encrypted data hold means 100 which holds encrypted version of data which is provided for use, a verification means 200 which communicates with the proving device 2000 to get proof data and verifies its legitimacy, a usage control means 300 which enables the use of data based on the verification result provided by the verification means 200, and a decryption means 400 which decrypts the data taken out of the encrypted data hold means 100 according to directions by the usage control means 300.

Although this embodiment is based on the premise that data is encrypted, data does not need to be encrypted if data access is always through the usage control means 300, in which case the decryption means 400 is not required.

Figure 2:
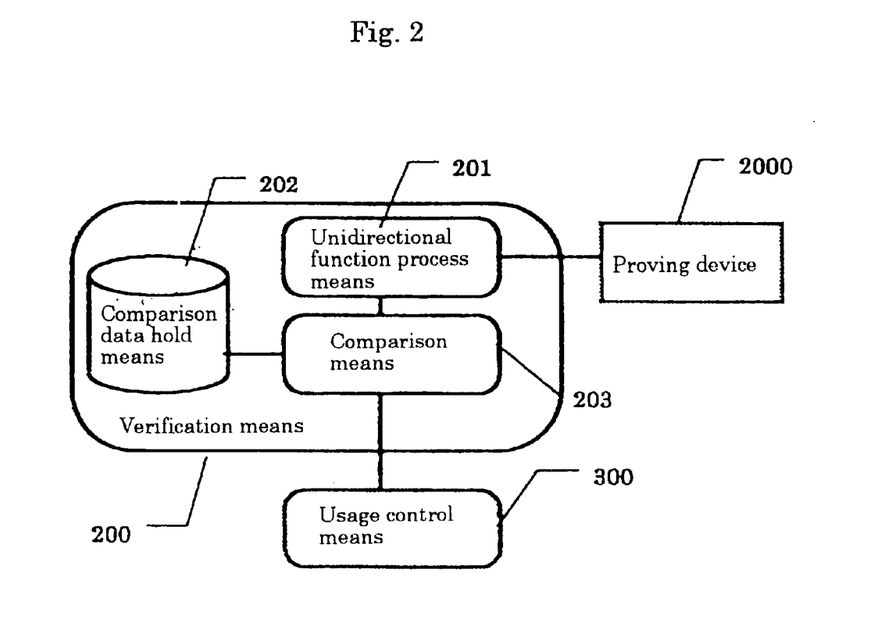
FIG. 2 is a block diagram showing the arrangement of the verification means of the first embodiment.

FIG. 2 shows a specific arrangement of the verification means 200. This verification means 200 merely verifies as to whether data generated by the proving device 2000 is legitimate.

In the figure, the verification means 200 comprises a one way function process means 201, a comparison data hold means 202, and a comparison means 203. The one way function process means 201 processes the proof data generated by the proving device 2000, and the comparison means 203 compares the processed value with data held by the comparison data hold means 202 and gives the result to the usage control means 300.

The proof data serves as a password for the use of data. Although, as a conceivable manner, the comparison data hold means 202 may hold the same data as the proof data to be received so that the comparison means 203 compares the data directly, it is desirable to hold in the comparison data hold means 202 proof data that has been rendered the one way function so as to prevent the leak of proof data by the analysis of the verification means 200. Based on this scheme, even if information held in the comparison data hold means 202 leaks, it is difficult to generate the proof data which is evaluated as a result of the rendition of one way function, and the security against illegal access can be enhanced.

When the proof data is verified to be legitimate as a result of data comparison by the comparison means 203, it is indicated to the usage control means 300. In response to the affirmative verification result, the usage control means 300 operates on the decryption means 400 to decrypt the data by using the preset decryption key so that the data can be used. Specifically, if data is a program, it will be executed, or if data is document data, it will be displayed, edited or printed, or if data is animation video data or audio data, it will be played back. In the case that the verification result is negative, nothing will take place, or non-legitimacy of proof data will be reported.

Figure 3:
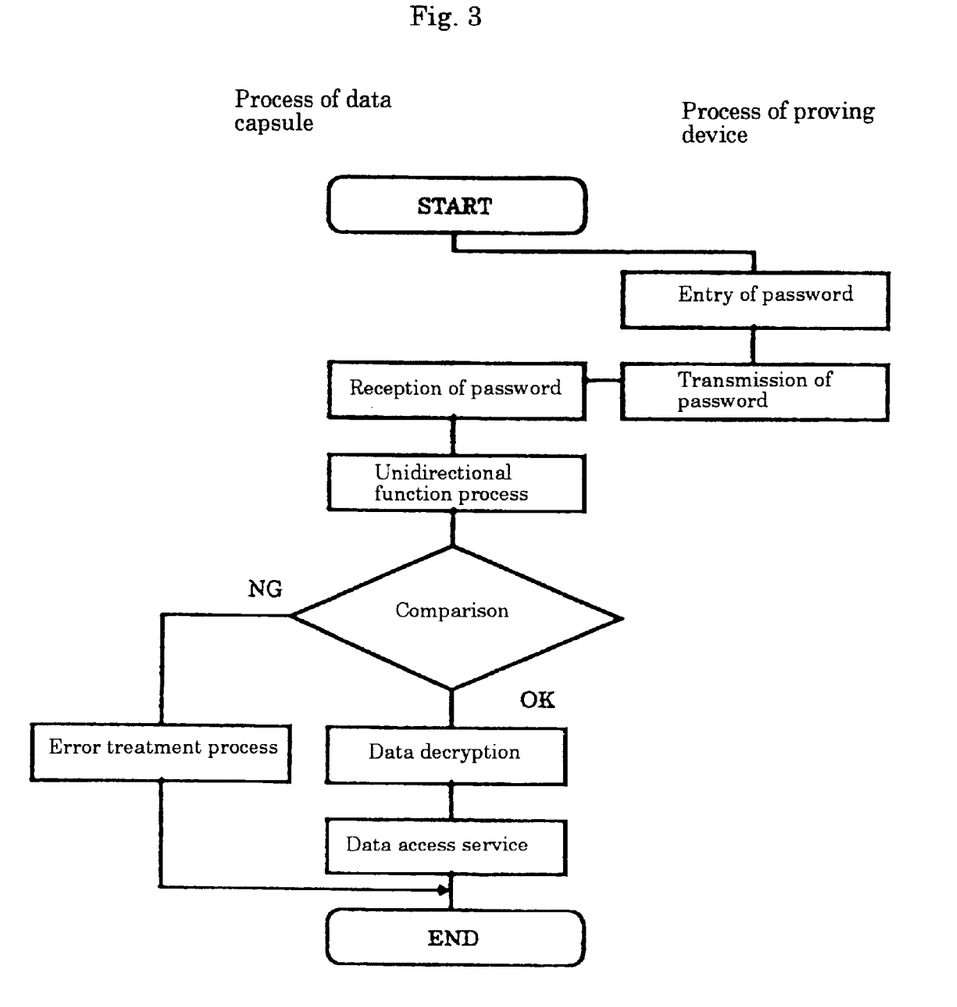
FIG. 3 is a flowchart used to explain the operation of the first embodiment.

FIG. 3 shows a flowchart with use of the verification means 200 in FIG. 2. The operation is evident from the flowchart, and detailed explanation thereof will be omitted.

For the tight control of data access, it is necessary to devise the data capsule 1000 so that decrypted data is not copied and leaked to the outside.

Although in the foregoing embodiment, encrypted data and the verification means 200, usage control means 300 and decryption means 400 are described to be individual components, such arrangement is not necessarily required. Instead, based on the provision of plug-in functions for the recent high-performance editor, viewer and browser, the verification means 200, usage control means 300 and decryption means 400 may be arranged as plug-in functions, with encrypted data being made correspondent to the plug-in functions.

Figure 4:
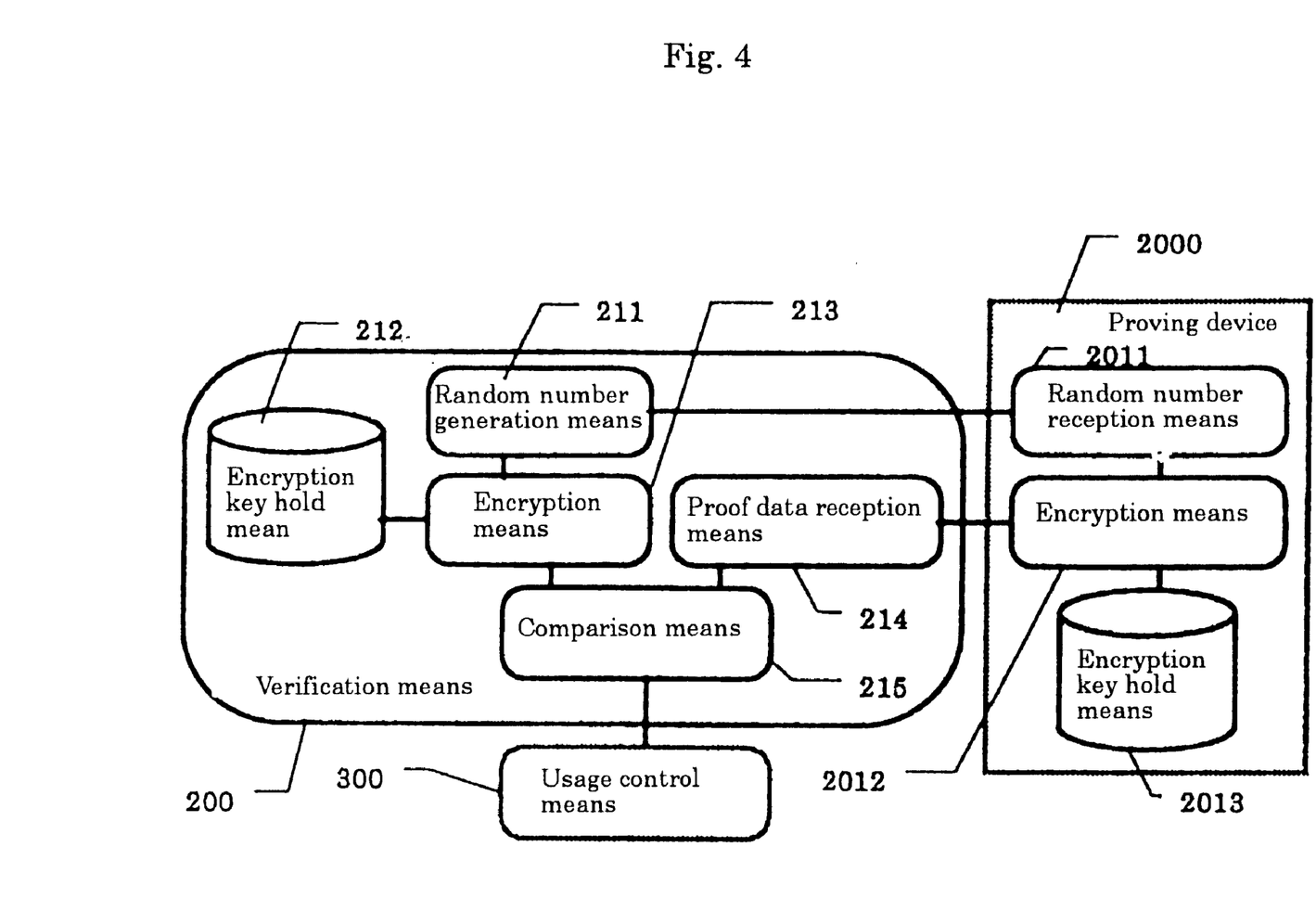
FIG. 4 is a block diagram showing the arrangement of the verification means and the proving device based on a second embodiment of this invention.

Embodiment 2:

Next, the second embodiment of this invention will be explained. In the proof data verification method of the preceding first embodiment, the proving device 2000 always sends the constant data to the verification means 200, and therefore their communication can be picked and reused (replay attack) for illegal data access. The second embodiment is intended to overcome this deficiency by modifying the verification means 200 and proving device 2000. The usage control means 300 and decryption means 400 are left unchanged from the first embodiment.

FIG. 4 shows mainly the verification means 200 and proving device 2000 of this embodiment. In the figure, the verification means 200 operates on its random number generation means 211 to generate a random number, and gives it to the encryption means 213 and also sends it to the random number reception means 2011 in the proving device 2000. The verification means 200 and proving device 2000 encrypt the received random number by using encryption keys held in their encryption key hold means 212 and 2013, respectively. The proving device 2000 sends the encrypted random number to the proof data reception means 214 in the verification means 200. In this manner, the verification means 200 and proving device 2000 have their encrypted random numbers, and the comparison means 215 compares these numbers, so that data access is enabled only if these encrypted random numbers coincide.

Figure 5:
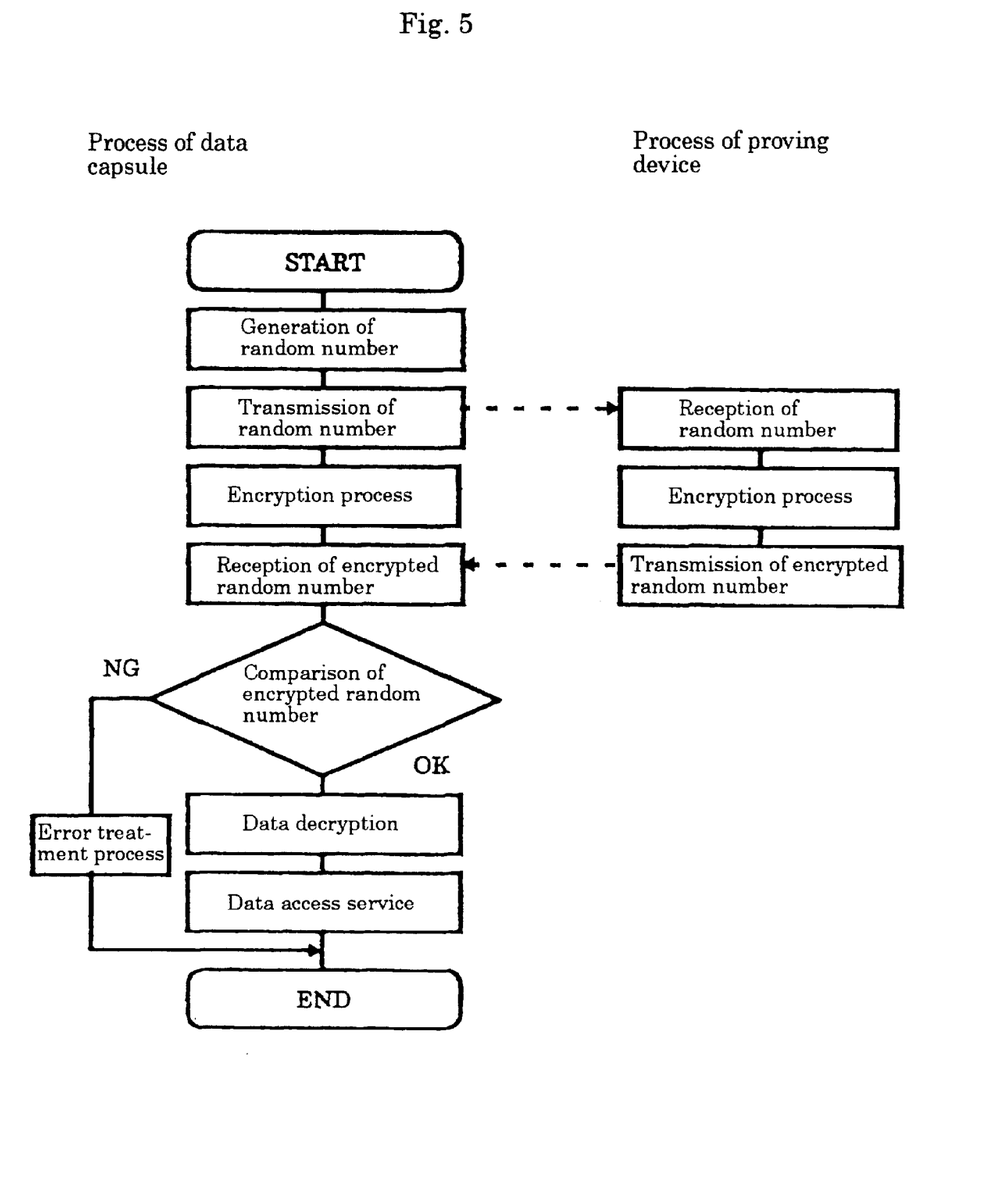
FIG. 5 is a flowchart used to explain the operation of the second embodiment.

FIG. 5 shows the proof data verifying operation based on this embodiment. The operation is evident from the flowchart, and detailed explanation thereof will be omitted.

In this example, the right of data access is the fact that the same encryption key held by the encryption key hold means 212 in the verification means 200 is also held by the encryption key hold means 2013 in the proving device 2000. For proving the same encryption key held by the verification means 200 and proving device 2000, the results of encryption for the same random number are compared. The communication between the data capsule 1000 and proving device 2000 is the transaction of a random number and encrypted version thereof which vary at each communication, and accordingly "replay attack" can be precluded. Although in this embodiment, verification of proof data is based on the comparison of the results of encryption of a random number, the encrypted random number from the proving device 2000 may be decrypted in the verification means 200 and compared with the original random number. Alternatively, instead of the scheme of encryption, verification of proof data may be carried out based on the comparison of values of a one way function which takes arguments of secret information and random number.

Embodiment 3:

Next, the third embodiment of this invention will be explained. In the methods of the first and second embodiments, data provided for use is encrypted, and therefore even the user who can directly access the storage medium cannot access the data. Accordingly, it is possible to implement the proper access control for data. However, since the data decryption key is included in the data capsule, the data capsule can possibly be analyzed to take out the decryption key and data decrypted with the decryption key can be used illegally. The third embodiment is intended to solve this problem.

Figure 6:
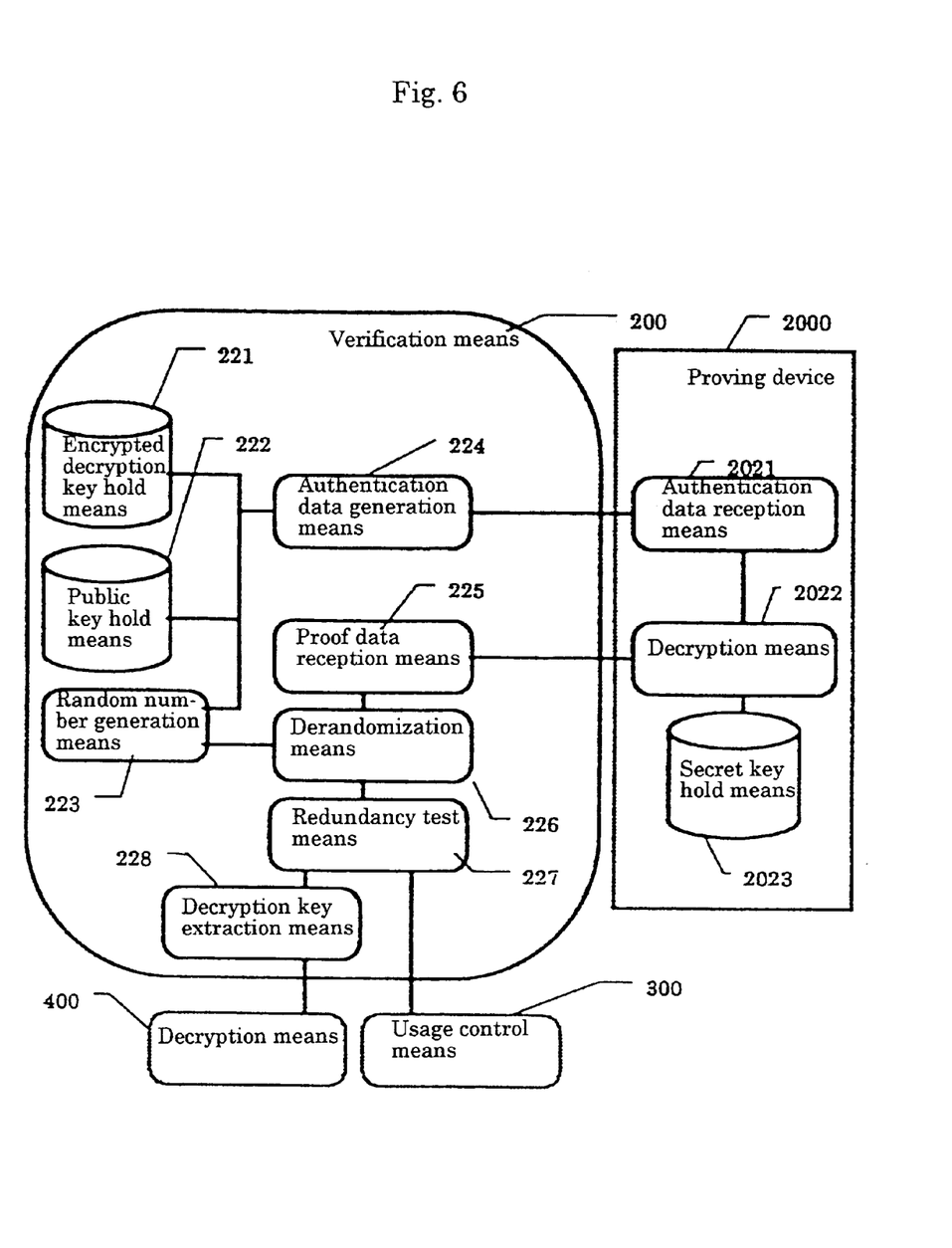
FIG. 6 is a block diagram showing the arrangement of the verification means and the proving device based on a third embodiment of this invention.

FIG. 6 shows the arrangement of the verification means 200 and proving device 2000 based on this embodiment. This embodiment uses the RSA (Rivest-Shamir-Adelman) public key encryption, although other encryption schemes may be used.

In the figure, the encrypted decryption key hold means 221 holds data that is a decryption key which has been given the redundancy and encrypted with an RSA-based public key. Specifically, the data held by the encrypted decryption key hold means 221 is expressed by the following formula (1).

$$h(k)^E \mod n \quad (1)$$

where k is the decryption key, h is the function for providing the redundancy, E is the RSA-based public key, and n is a modulo. The function h for providing the redundancy is to add a specific bit string or produce a result of a number of times of data manipulation, and has the abilities of checking for the breakage of data afterward and restoring the original data, as standardized in ISO9796 for example.

The public key hold means 222 holds the RSA-based public key E for decrypting data and the modulo n, and the random number generation means 223 generates a random number r. The proof data generation means 224 calculates the following formula (2) by using values provided by the encrypted decryption key hold means 221, public key hold means 222 and random number generation means 223, and sends the result as authentication data to the proving device 2000.

$$r^E h(k)^E \mod n \quad (2)$$

The proving device 2000 operates on its authentication data reception means 2021 to receive the authentication data, operates on its decryption means 2022 to decrypt the authentication data using the private key D held by the private key hold means 2023, and sends the result as proof data to the data capsule. Specifically, the decryption means 2022 calculates the following formula (3).

$$r^E h(k)^E)^D \mod n = rh(k) \mod n \quad (3)$$

The proof data sent from the proving device 2000 is received by the proof data reception means 225 in the data capsule. The derandomization means 226 multiplies the inverse of the random number r generated by the random number generation means 223 to the proof data thereby to evaluate the h(k) as follows.

$$rh(k) \cdot r^{-1} \mod n = h(k) \mod n \quad (4)$$

The redundancy test means 227 examines the resulting h(k) for the presence of redundancy provided in advance. If the test result is affirmative, it is indicated to the usage control means 300, and the decryption key extraction means 228 extracts the decryption key k and gives it to the decryption means 400. Otherwise, if the test result is negative, it is indicated to the usage control means 300, which then implements the error treatment process.

Figure 7:
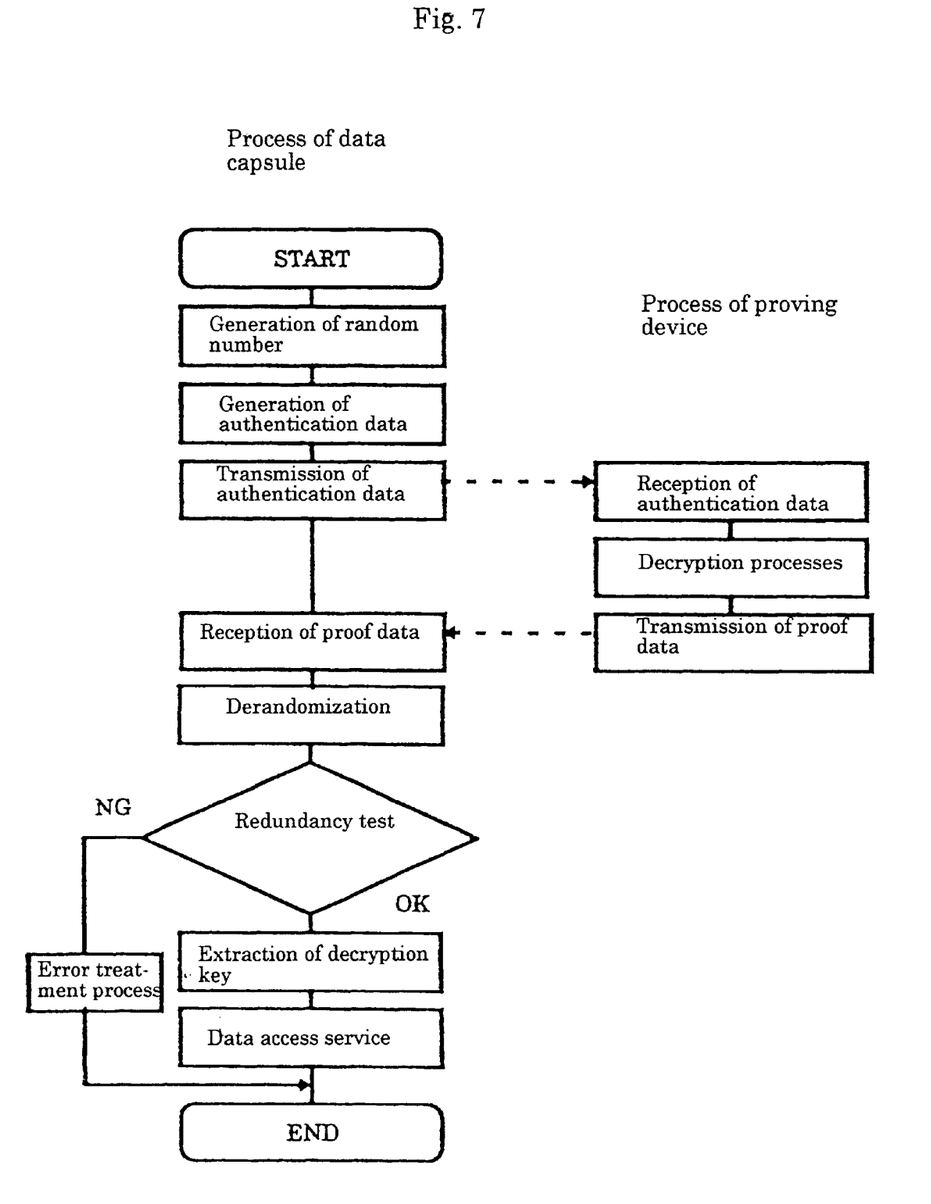
FIG. 7 is a flowchart used to explain the operation of the third embodiment.

FIG. 7 shows the operation of this embodiment. The operation is evident from the flowchart, and detailed explanation thereof will be omitted.

According to this embodiment, data decryption key does not exist in the data capsule, and accordingly even if the data capsule is analyzed, it is impossible to get information for attempting illegal data access. Based on the provision of the randomization for the communication between the proving device 2000 and the data capsule 1000, the occurrence of "replay attack" is prevented and the leak of data, which can be used for illegal data access, from the communication is also precluded.

Embodiment 4:

Next, the fourth embodiment of this invention will be explained. In case data provided for use are document data, animation video data or audio data, it is possible to protect decrypted data by the provision of a dedicated viewer, browser or editor connected to the decryption means, whereas in case data provided for use is a program, the system needs a division of functions. This embodiment and the successive embodiment pertain to the data capsule of the case where data are confined to programs.

For the system operation in which programs are encrypted and the encrypted programs are decrypted and executed only when the right of use is proved, the following two points must be considered.

(1) Part of program to be encrypted.

(2) Location where the decrypted program is placed.

Initially, the first point will be explained. Generally, a program is offered as a file. Accordingly, the easiest and simplest manner is to encrypt the whole program file. However, recent program files have attribute information such as icons of programs for display, and therefore encryption of the whole program file inclusive of the attribute information will incur a problem in terms of utility. On this account, at least the attribute information that is used outside of program execution must be excluded from encryption. Depending on the timing of decryption of the program, part of the program to be encrypted must be determined from other viewpoints, as will be described later.

The second point will be explained. The most simple manner of decrypting a program and executing the program is to create a decrypted program file and execute the program file. However, a decrypted program file created in such a place as the magnetic disk which is easily accessible by users can possibly be copied and used illegally.

In order to prevent this impropriety, decrypted programs need to be placed in a memory which is controlled so that programs cannot be seen by other processes, for example.

In this embodiment, part of the program file except for data that is used at the time of execution is encrypted, and for the use of the program file, it is decrypted in a safe memory for execution after the right of execution has been verified.

Figure 8:
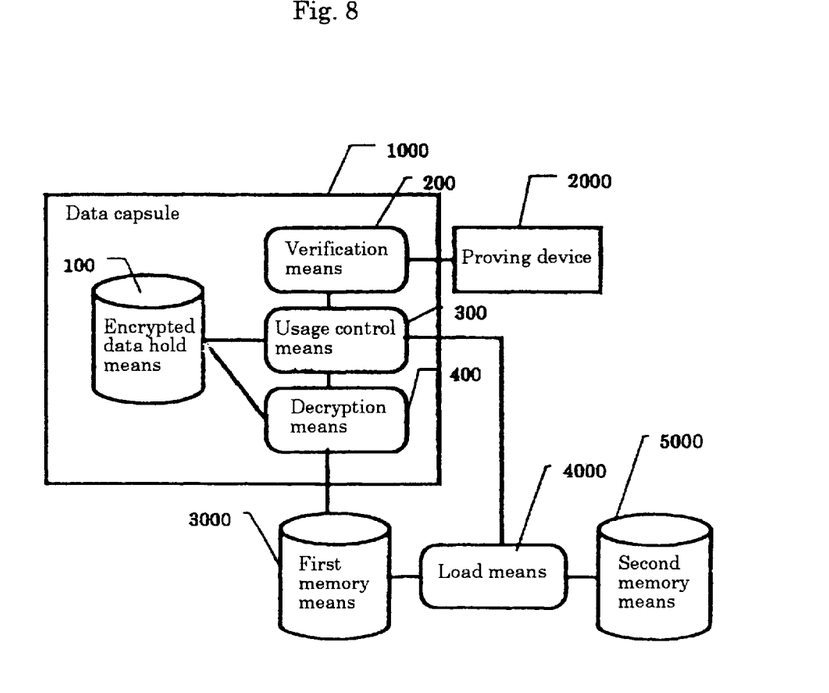
FIG. 8 is a block diagram showing the data capsule based on a fourth embodiment of this invention.
Figure 9:
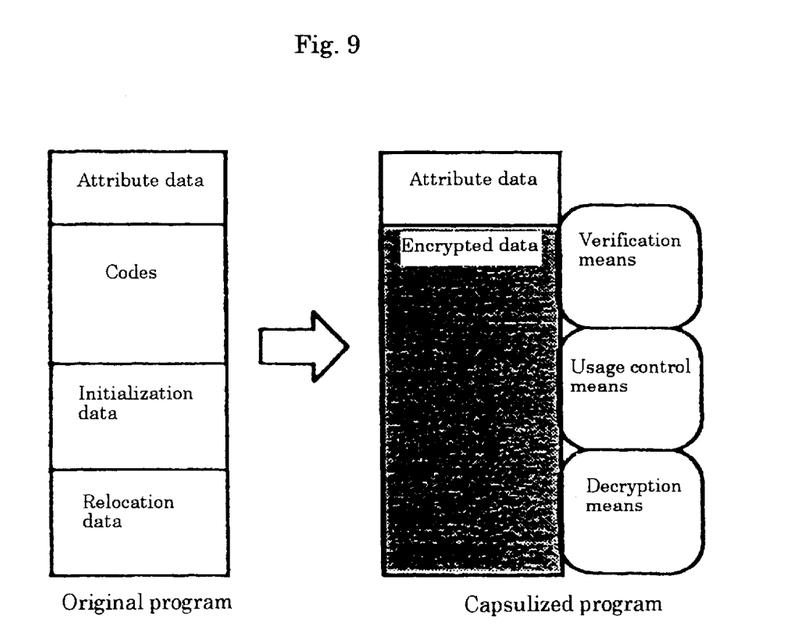
FIG. 9 is a diagram used to explain in a sense of model the data capsule of the fourth embodiment.

FIG. 8 shows conceptually the arrangement of this embodiment. In the figure, the encrypted data hold means 100, verification means 200 and decryption means 400 in the data capsule 1000 and the proving device 2000 are all identical to those of the first through third embodiments. The usage control means 300 has basically the same operation as the counterpart of the preceding embodiments except that it controls the external load means 4000. FIG. 9 shows in a sense of model the data capsule (capsulized program) of this embodiment. In this example, the attribute data is held without being encrypted.

Figure 10:
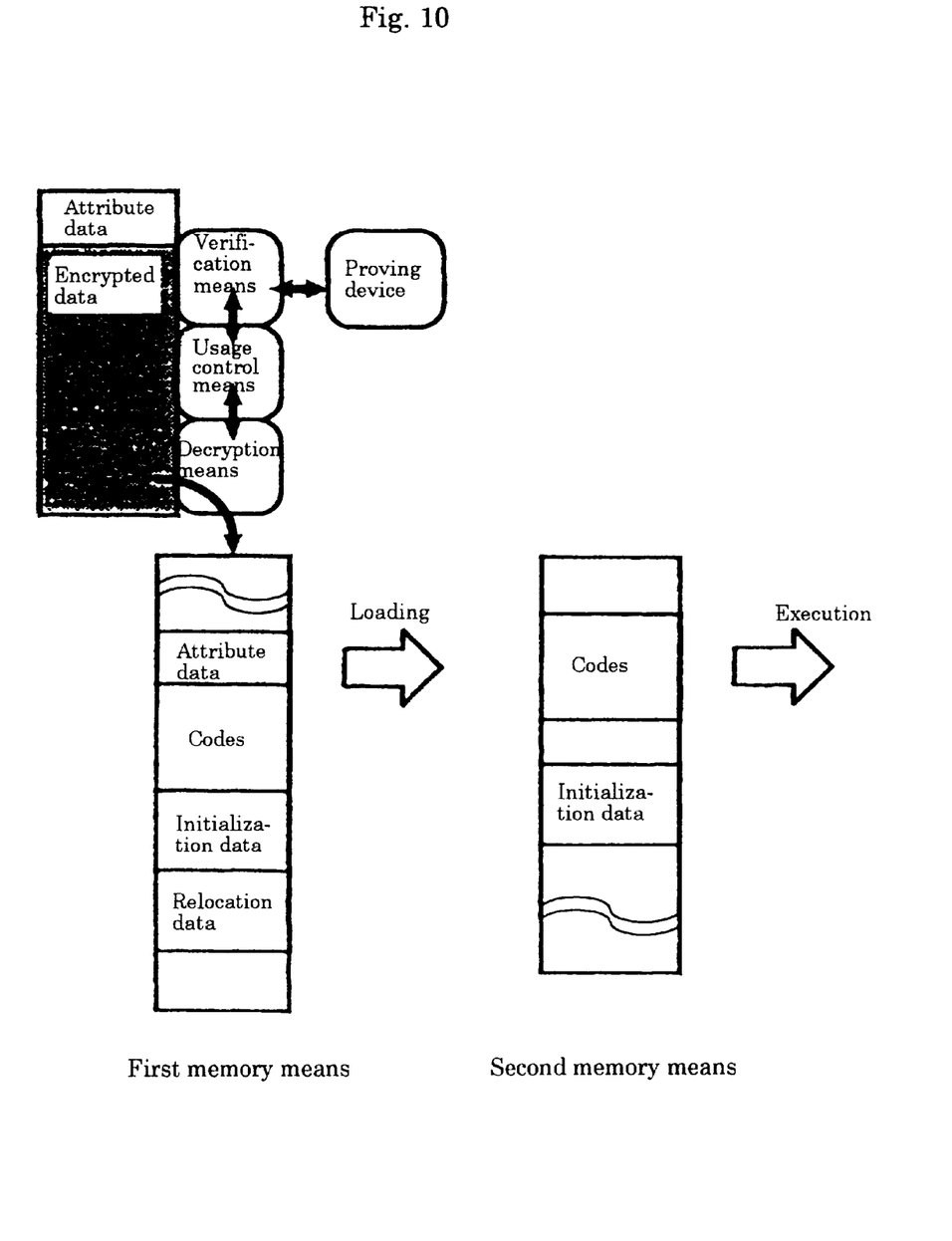
FIG. 10 is a diagram used to explain in a sense of model the decryption of the data capsule of the fourth embodiment.

The encrypted data hold means 100 holds a program, with its program execution codes and initial data being encrypted. In case the user uses the program in the encrypted data hold means 100, the verification means 200 verifies the user's right and the decryption means 400 decrypts the program and transfers the decrypted program to the first memory means 3000. The first memory means 3000 is an access-controlled memory, for example, so that it cannot be seen from other processes. On completion of decryption, the usage control means 300 directs the load means 4000 to load the executable program file held in the first memory means 3000. The load means 4000 develops the program file in the first memory means 3000 into the second memory means 5000. Thereafter, control is transferred to the developed program, and it runs. FIG. 10 shows this state in a sense of model.

Embodiment 5:

Next, the fifth embodiment of this invention will be explained.

Figure 11:
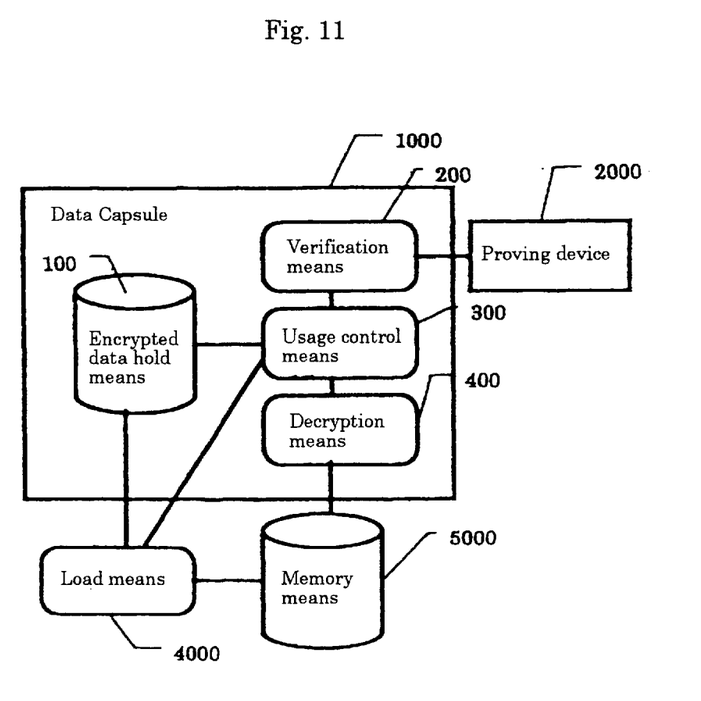
FIG. 11 is a block diagram showing the data capsule based on a fifth embodiment of this invention.
Figure 12:
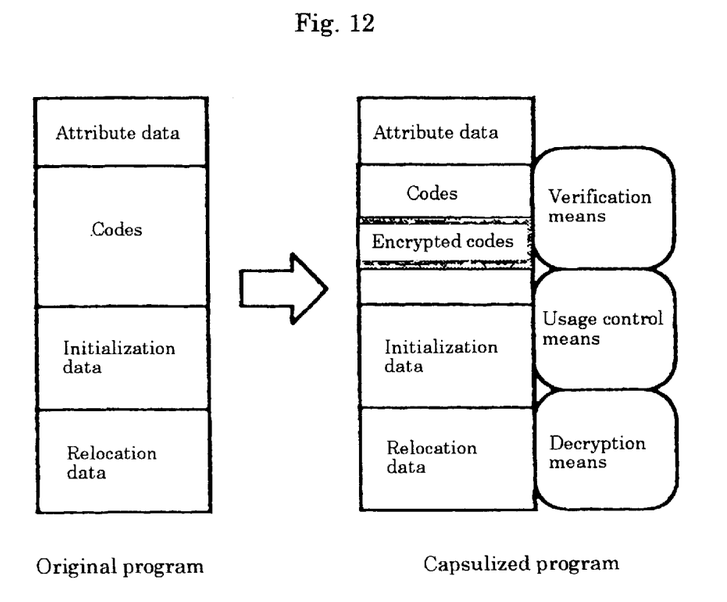
FIG. 12 is a diagram used to explain in a sense of model the data capsule of the fifth embodiment.

There is another conceivable manner of executing an encrypted program without writing the decrypted program in such an unsafe location as a magnetic disk. FIG. 11 shows conceptually the arrangement of this embodiment. In the figure, the encrypted data hold means 100, verification means 200 and decryption means 400 in the data capsule 1000 and the proving device 2000 are all identical to those of the first through third embodiments, except that the decryption means 400 does not decrypt data held in the encrypted data hold means 100, but it decrypts data in the memory means 5000. In this embodiment, the load means 4000 develops the encrypted program, with its encrypted state being retained, into the memory means 5000. Therefore, it is necessary for this embodiment to encrypt the program in advance by excluding information that is needed at the time of loading, such as relocation information. In addition, codes are partially rewritten at the time of loading, and therefore it is necessary to know this portion from the relocation information and exclude it from encryption. FIG. 12 shows in a sense of model the data capsule of this embodiment.

Figure 13:
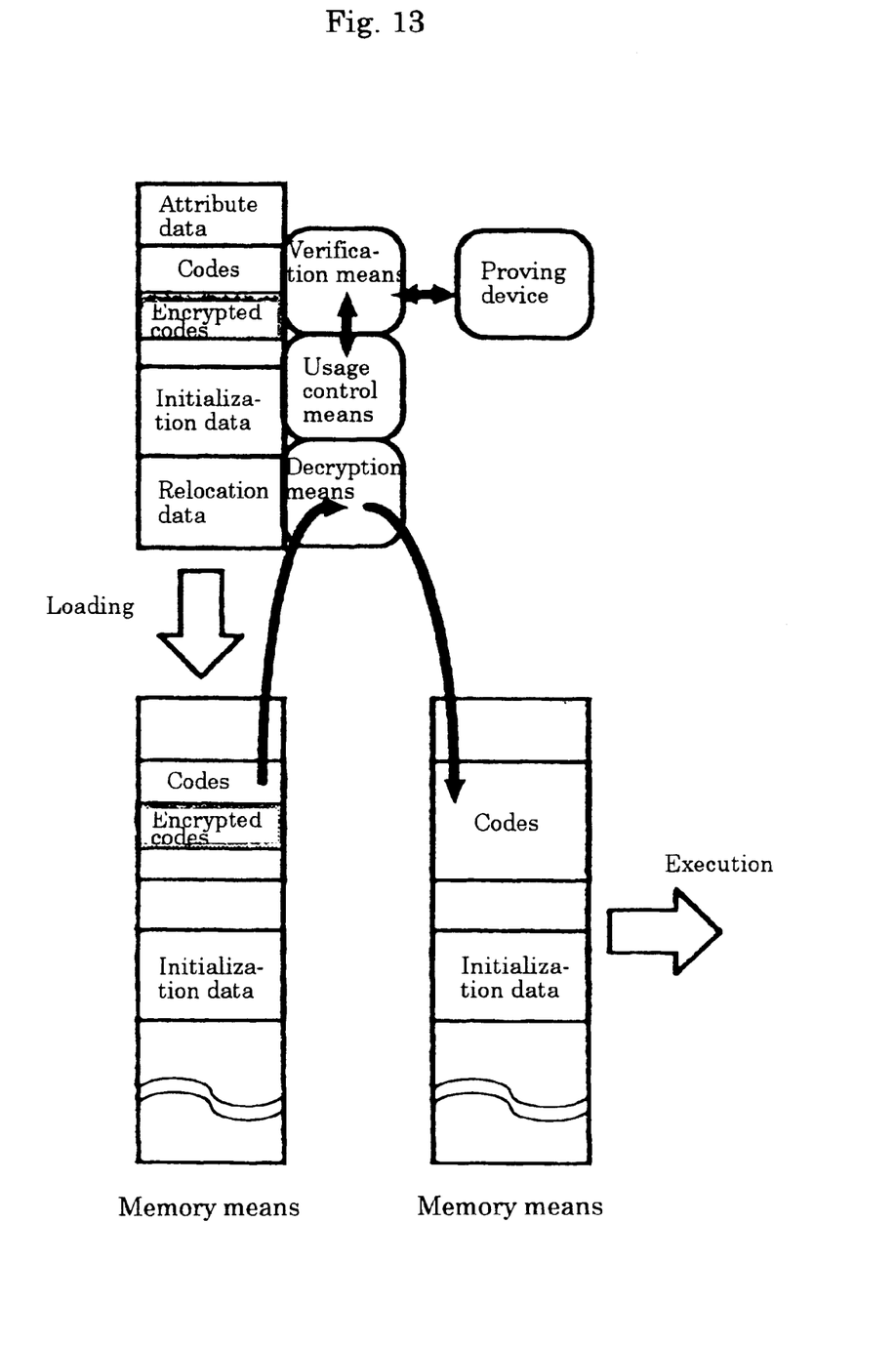
FIG. 13 is a diagram used to explain in a sense of model the decryption of the data capsule of the fifth embodiment.

After the encrypted program has been developed in its encrypted state into the memory means 5000, if the verification result is affirmative, the decryption means 400 decrypts the encrypted portion of the program in the memory means 5000 so that the program is executable. Thereafter, control is transferred to the program, and it runs. FIG. 13 shows this state in a sense of model.

Figure 14:
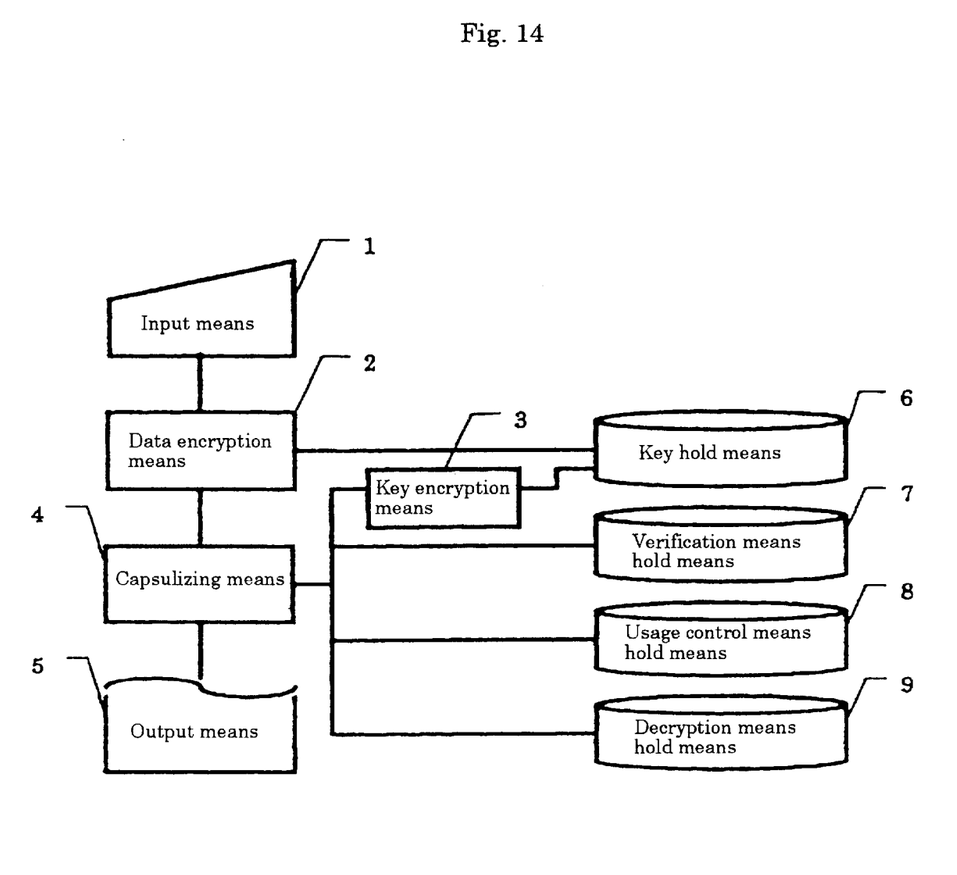
FIG. 14 is a block diagram showing the arrangement of the data capsule generation apparatus based on a sixth embodiment of this invention.

Embodiment 6:

Next, the sixth embodiment of this invention will be explained. The following explains the apparatus which generates the data capsule described above. FIG. 14 shows the overall arrangement of the data capsule generation apparatus of this embodiment. The data capsule generation apparatus comprises an input means 1 for entering data to be capsulized, a data encryption means 2 which encrypts the input data, a key encryption means 3 which encrypts the data decryption key so that only legitimate users can decrypt the data, a capsulizing means 4 which makes the encrypted data correspondent to the encrypted decryption key, verification means, usage control means and decryption means, an output means 5 which releases the capsulized data, a key hold means 6 which memorizes the decryption key necessary for the capsulizing of data and information of the verification means, usage control means and decryption means, a verification means hold means 7, a usage control means hold means 8, and a decryption means hold means 9.

In case the capsule incorporates the key for decrypting encrypted data, the key encryption means 3 is not needed, but instead, it is necessary for the capsulizing means 4 to embed the decryption key within the capsule. In another case where data encryption is not carried out, the data encryption means 2 and key encryption means 3 are not required, and it is further unnecessary to embed the encrypted decryption key or decryption key and to make correspondent to the decryption means. In case the capsulizing object is a program, it is necessary for the data encryption means 2 to find the portion of program to be encrypted.

Figure 15:
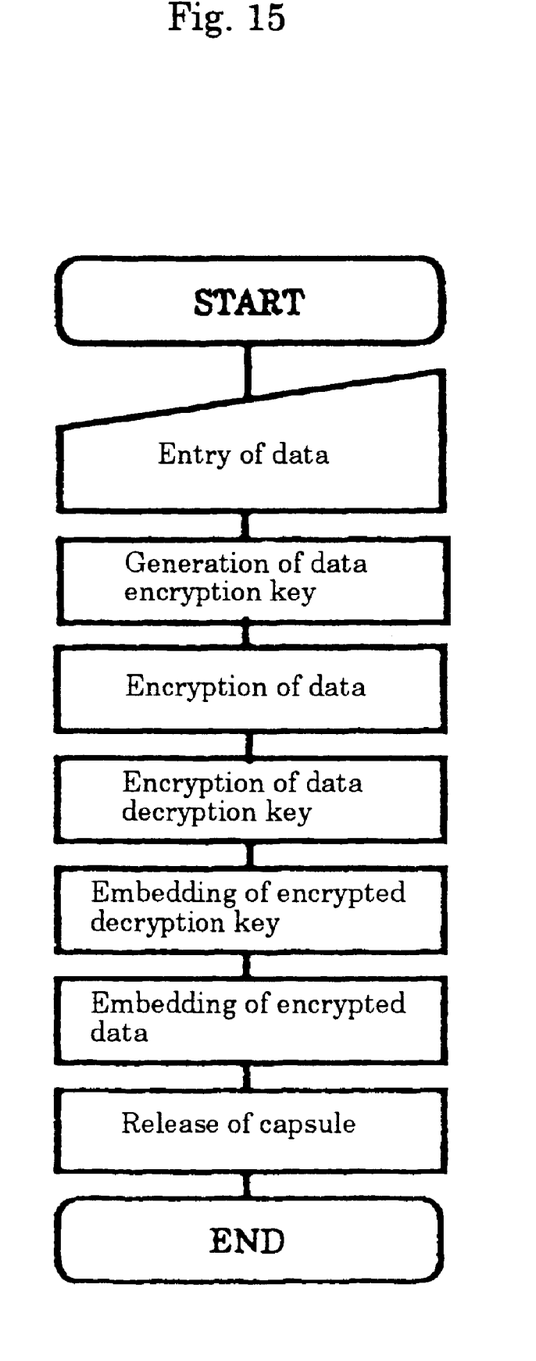
FIG. 15 is a flowchart used to explain an example of the operation of the data capsule generation apparatus of the sixth embodiment.

Next, the operation of the data capsule generation apparatus for an example of capsulizing video data will be explained. It is assumed that a program for displaying video data is ready for use. The verification means, usage control means and decryption means are included in the video data display program. The video data display program is assumed to have functions of implementing the verification by using the encrypted decryption key which is embedded in the area from X byte to X+a byte of its own program file, decrypting, by use of the decryption key obtained from the verification, the encrypted video data which is embedded in the area from Y byte to Y+b byte of its own program file, and displaying the decrypted video data. FIG. 15 shows by flowchart the procedure of data capsule generation. Initially, data provided for use is entered and a key for encrypting the data is generated. Although data encryption scheme is arbitrary, it is desirable in the case of encrypting a large quantity of data to use the common key encryption scheme which has the ability of fast decryption. The next step encrypts the data decryption key so that it can be decrypted by the proving device. With the encrypted decryption key and encrypted data being embedded in certain locations of the video display program, the generated capsule is released. The encrypted decryption key may be embedded in the encrypted data, instead of the video display program. Although the video data is embedded in the program in this example, an alternative manner is to arrange the verification means, usage control means and decryption means as a plug-in viewer, browser and editor and make the encrypted video data to be correspondent to the plug-in devices. A possible manner of data correspondence to the plug-in devices, which varies depending on the operating apparatus, is to specify extensions for data files, for example.

Figure 16:
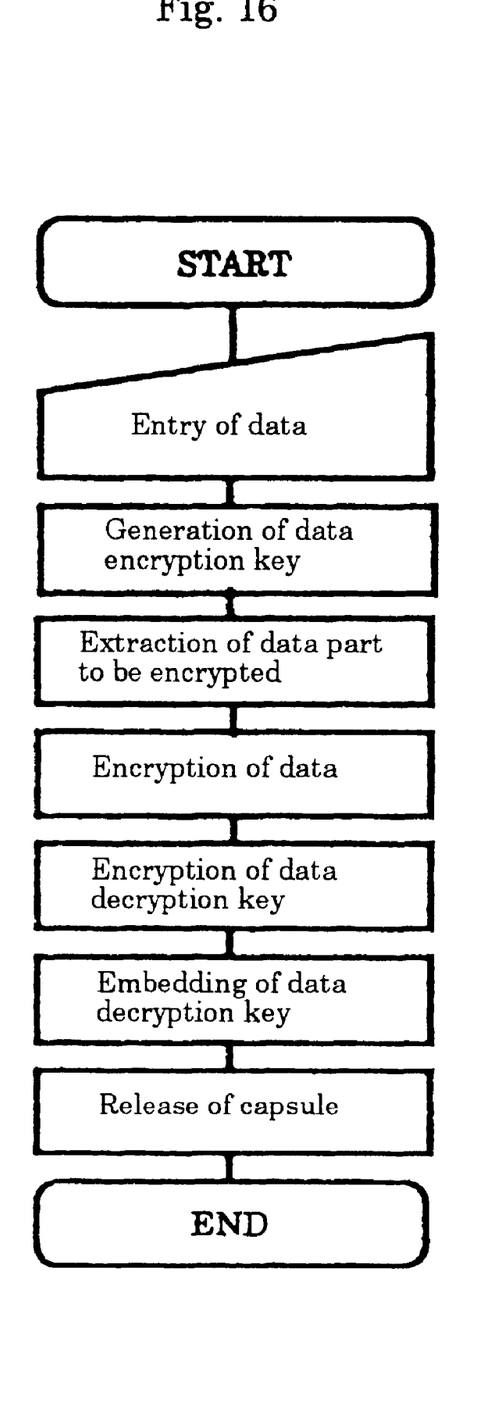
FIG. 16 is a flowchart used to explain another example of the operation of the data capsule generation apparatus of the sixth embodiment.

Next, the operation of the data capsule generation apparatus for an example of capsulizing a program will be explained. The basic arrangement of the data capsule generation apparatus is the same as shown in FIG. 14. The data capsule generation apparatus receives an executable program file through the data input means 1, and operates on the data encryption means 2 to generate a key used to encrypt the program. It determines the location used for encryption from the relocation information, etc., and implements the program encryption by using the key. The data decryption key which has been encrypted by the data encryption means 2 is held temporarily by the key hold means 6. Subsequently, the encrypted decryption key encrypted by the key encryption means 3 and a sub-program having functions of the verification means, usage control means and decryption means are appended to the program which has been encrypted partially by the capsulizing means 4 so that the data decryption key held by the key hold means 6 can be decrypted by the proving device, thereby causing the verification means, usage control means and decryption means to start operating once the partly encrypted program is executed. The capsule arranged in this manner is finally released by the output means 5. FIG. 16 shows this operation. The operation is evident from the flowchart, and detailed explanation thereof is omitted.

Based on the inventive data capsule, the access control environment, which can be used among a plurality of systems having access control facilities and can prevent the disorder of access control due to the illegal take-out by non-legitimate users, can be accomplished. Based on the inventive data capsule generation apparatus, the data capsule having the above-mentioned effectiveness can be generated easily.

What is claimed is:

1. A data capsule comprising:
   data;
   verification means for verifying a verification result by a one-way function from proof data generated and sent by a proving device external to the data capsule, wherein the one-way function generates values by using a random number generated for each verification result; and usage control means for controlling use of the data based on the verification result provided by the verification means.

2. A data capsule comprising:

data;

verification means for verifying a verification result from authentication data generated by the verification means and sent to a proving device external to the data capsule, wherein the proving device generates and sends proof data based on the received authentication data to the verification means to provide a verification result, wherein the authentication data is generated by using values of an encrypted decryption key, a public key and a random number generated for each instance of sending verification data to an external proving device; and usage control means that control use of the data based on the verification result provided by the verification means.

3. The data capsule according to claim 2, wherein the proof data generated by said proving device is a key for decrypting said encrypted data or data for generating the key, said decryption means decrypting the data by using the proof data.

4. The data capsule according to claim 3, wherein the authentication data generated by said verification means is a key for decrypting the encrypted data or data for generating the key, said proving device decrypts said encrypted key or data for generating the key.

5. The data capsule according to claim 2, wherein said data is a program, and said usage control means executes said program or a partial function of said program based on a verification result provided by the verification means.

6. The data capsule according to claim 5, wherein an executable portion of the program is encrypted, further comprising:

decryption means for decrypting the encrypted executable portion of the program based on the verification result provided by the verification means; and load means for loading the program including the decrypted executable portion of the program into a memory for execution.

7. The data capsule according to claim 5, wherein an executable portion of the program is encrypted and is capable of loading to the memory by the load means, and based on a verification result provided by the verification means, the load means loads the program including the encrypted executable portion of the program into the memory where the decryption means decrypts the encrypted executable portion of the program based on the verification result provided by the verification means for program execution.

8. The data capsule according to claim 5, wherein at least one section of a unit function of the program is encrypted and is capable of loading to the memory by the load means, and based on a verification result provided by the verification means, the load means loads the program including the encrypted at least one section of a unit of the program into the memory where the decryption means decrypts the at least one section of a unit of the program based on the verification result provided by the verification means for program execution.

9. The data capsule according to claim 2, wherein said data comprises video information, audio information, or animation video information, and said usage control means implements a display, playback of printing of said data based on the verification result provided by the verification means.

10. The data capsule according to claim 2, wherein the data is encrypted, further comprising decryption means for decrypting the encrypted data, wherein the decryption means is controlled by the usage control means when the proof data is verified.

11. The data capsule according to claim 2, wherein the verification means and the usage control means are programs or sub-programs, wherein the usage control means controls use of the data based on the verification result provided by the verification means.

12. The data capsule according to claim 2, wherein the data capsule is stored in an electronic, optical, or magnetic storage medium.

* * * * *